(12) United States Patent
Mead et al.

(10) Patent No.: US 7,538,962 B2
(45) Date of Patent: May 26, 2009

(54) MEDIA EVENT TIMER AND METHODS FOR USE THEREWITH

(75) Inventors: John Mead, Longmont, CO (US); William Bliss, Thornton, CO (US)

(73) Assignee: Broadcom Corporation, Irvine, CA (US)

( * ) Notice: Subject to any disclaimer, the term of this patent is extended or adjusted under 35 U.S.C. 154(b) by 452 days.

(21) Appl. No.: 11/311,727

(22) Filed: Dec. 19, 2005

(65) Prior Publication Data

US 2007/0139807 A1 Jun. 21, 2007

(51) Int. Cl.
*G11B 5/09* (2006.01)

(52) U.S. Cl. .............................. 360/51; 360/48; 360/53

(58) Field of Classification Search .................. None
See application file for complete search history.

(56) References Cited

U.S. PATENT DOCUMENTS

| | | | | |
|---|---|---|---|---|
| 4,271,519 A | * | 6/1981 | Hall | 714/771 |
| 4,618,898 A | * | 10/1986 | Young et al. | 360/51 |
| 4,746,997 A | * | 5/1988 | Shrinkle et al. | 360/49 |
| 5,420,730 A | * | 5/1995 | Moon et al. | 360/77.08 |
| 5,444,583 A | * | 8/1995 | Ehrlich et al. | 360/78.09 |
| 5,604,646 A | * | 2/1997 | Yamawaki | 360/53 |
| 5,706,265 A | * | 1/1998 | Bang | 369/47.48 |
| 5,768,234 A | * | 6/1998 | Satomura | 369/59.19 |
| 5,825,568 A | * | 10/1998 | Lee | 360/51 |
| 6,021,012 A | * | 2/2000 | Bang | 360/51 |
| 6,449,111 B1 | * | 9/2002 | Kool et al. | 360/48 |
| 6,839,194 B2 | * | 1/2005 | Koyanagi | 360/51 |
| 7,474,487 B2 | * | 1/2009 | Southerland et al. | 360/51 |
| 2004/0125479 A1 | * | 7/2004 | Ehrlich | 360/39 |

* cited by examiner

*Primary Examiner*—Hoa T Nguyen
*Assistant Examiner*—Dismery E Mercedes
(74) *Attorney, Agent, or Firm*—Garlick Harrison & Markison; Bruce E. Stuckman (57) ABSTRACT

A media event timer includes a counter module for generating a sequence of counts based on a clock signal of a disk drive unit. A counter reset module sets the counter module to a reset count in response to a servo address mark detection signal. A detector module detects that a servo address mark has been missed and sets the counter module to a restart count when the servo address mark has been missed. A trigger module triggers a first media event when a first media event count compares favorably to a count of the sequence of counts.

13 Claims, 11 Drawing Sheets

MEDIA EVENT TIMER AND METHODS FOR USE THEREWITH

CROSS REFERENCE TO RELATED PATENTS

Not applicable

BACKGROUND OF THE INVENTION

1. Technical Field of the Invention

The present invention relates to media event timers, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

As a magnetic hard drive is manufactured it is formatted at the factory. The formatting process lays out a plurality of concentric tracks of data on that disk that are separated by wedges of servo data distributed at equal angular displacements. The servo data includes a track number and a wedge number that are used by the disk controller to locate desired tracks and sectors of user data that are stored on the disk. Each wedge of servo data is preceded by a servo address mark that consists of a detectable pattern, such as an area with no magnetic transitions, that is used to indicate that the servo data will be coming up next. While the servo address marks are used to guide the reading of servo data, independent clock signals are used for timing of read and write operations. Because of the speed and high track density of modem disk drives, errors can occur in reading the servo address mark and, in particular, it is not uncommon that a servo address mark can be missed altogether, A sizable market has developed for these devices and the price per unit of storage has steadily dropped. Modem host devices are provided with greater storage capacity at reduced cost, compared with devices that where manufactured a few years earlier. The need exists for efficient disk drives that can store and retrieve data with greater accuracy and at greater density.

SUMMARY OF THE INVENTION

The present invention sets forth a media event timer and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

The present invention provides several advantages over the prior art. In an embodiment of the present invention, a media event timer correlates specific locations on the disk with specific counts from a servo address mark. Compensation is provided for missed servo address marks. A simple and more accurate system can be implemented to time the starting of selected events based on their position on the media.

Figure 1:
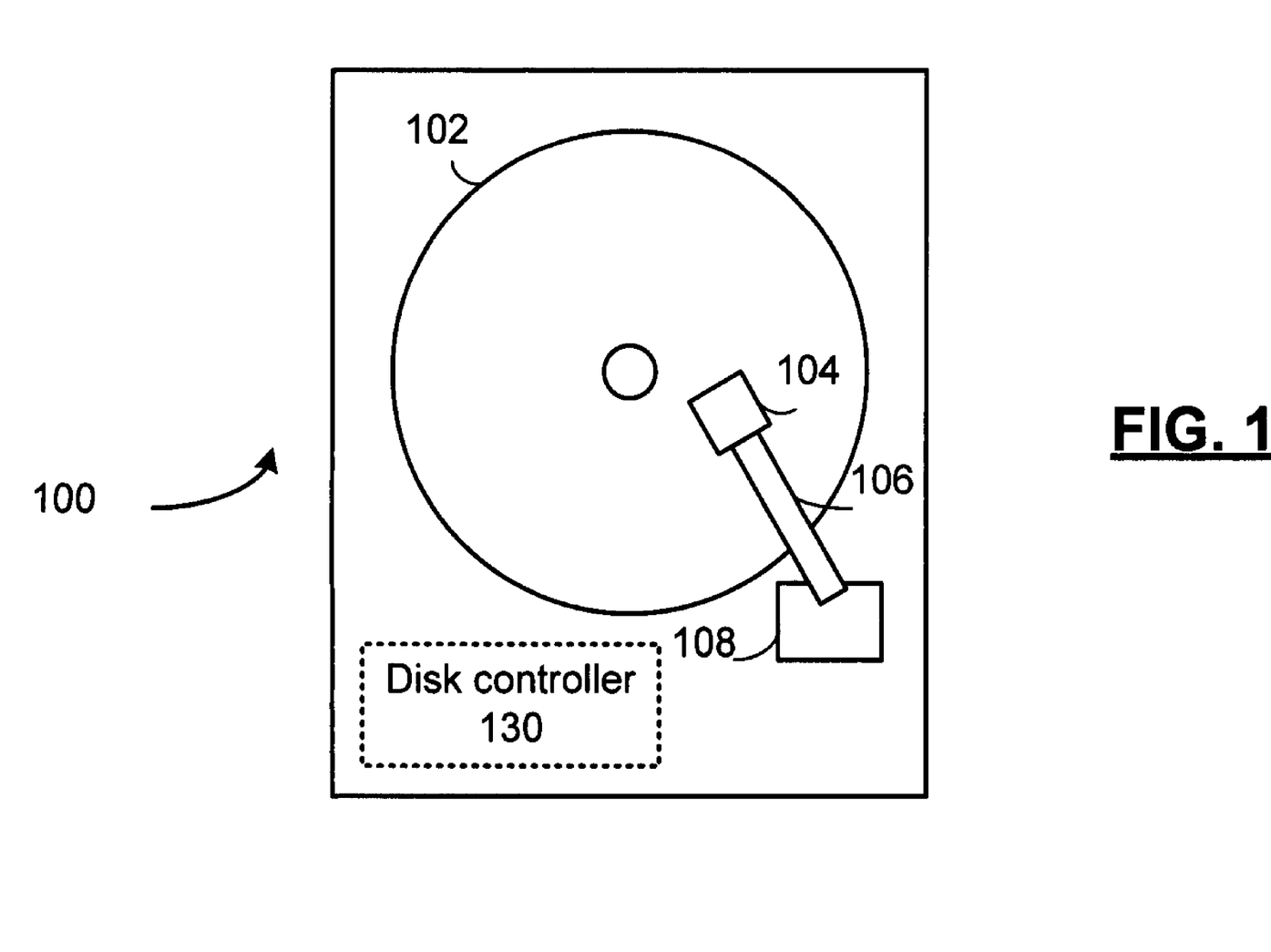
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device. Disk controller 130, provides one or more functions or features of the present invention, as described in further detail in conjunction with the figures that follow.

Figure 2:
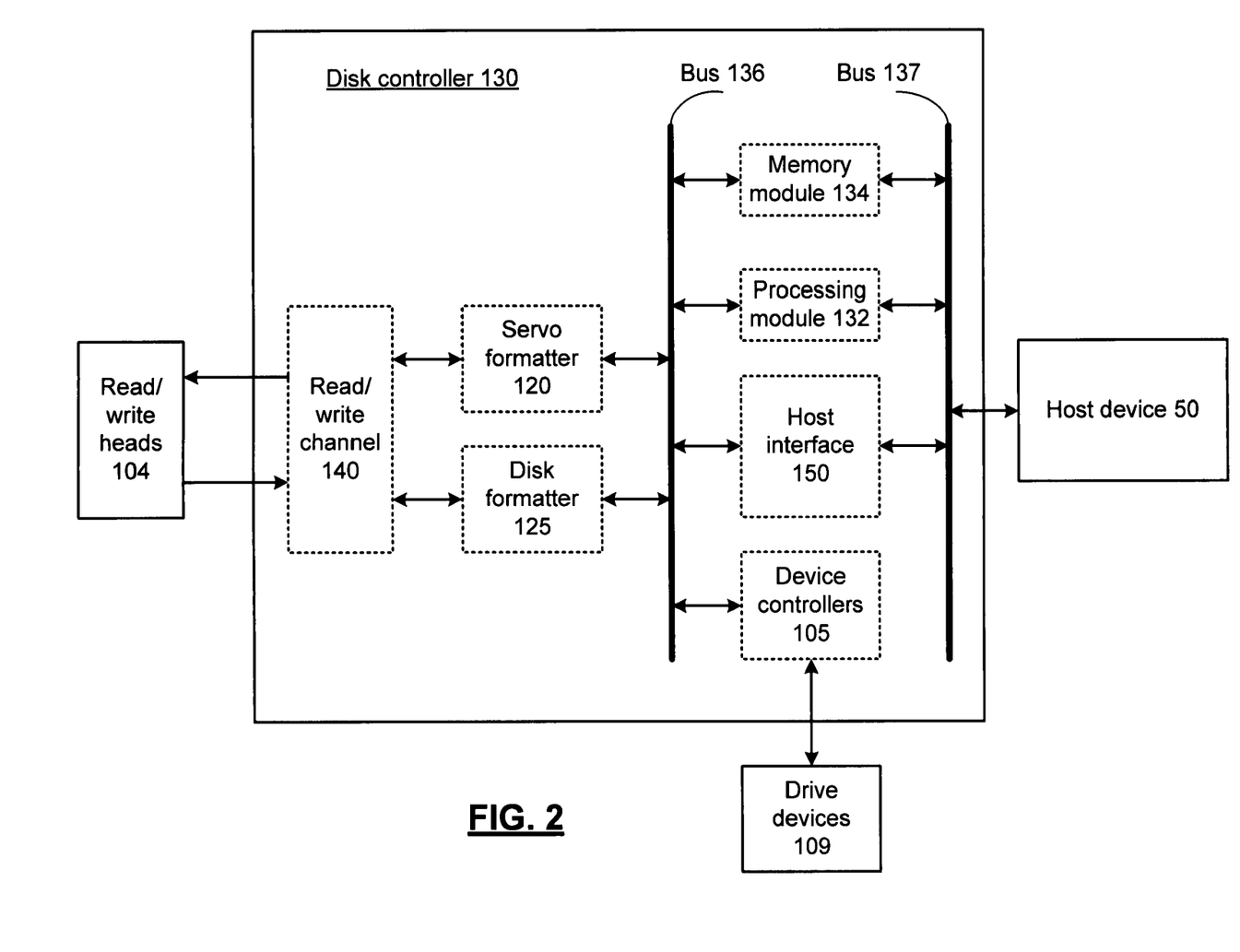
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102 servo formatter 120 provides clock signals and other timing signals based on servo control data read from disk 102, device controllers 105 control the operation of drive devices 109 such as actuator 108 and the servo motor, etc. Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing timing generator 110, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes device controllers 105 and optionally additional modules, such as a power supply, etc. In a further embodiment of the present invention, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are read by the servo formatter 120 and used by the disk formatter 125 and/or read write channel 140 for triggering the "start time" for various events as will be described in further detail in conjunction with the figures that follow.

Figure 3:
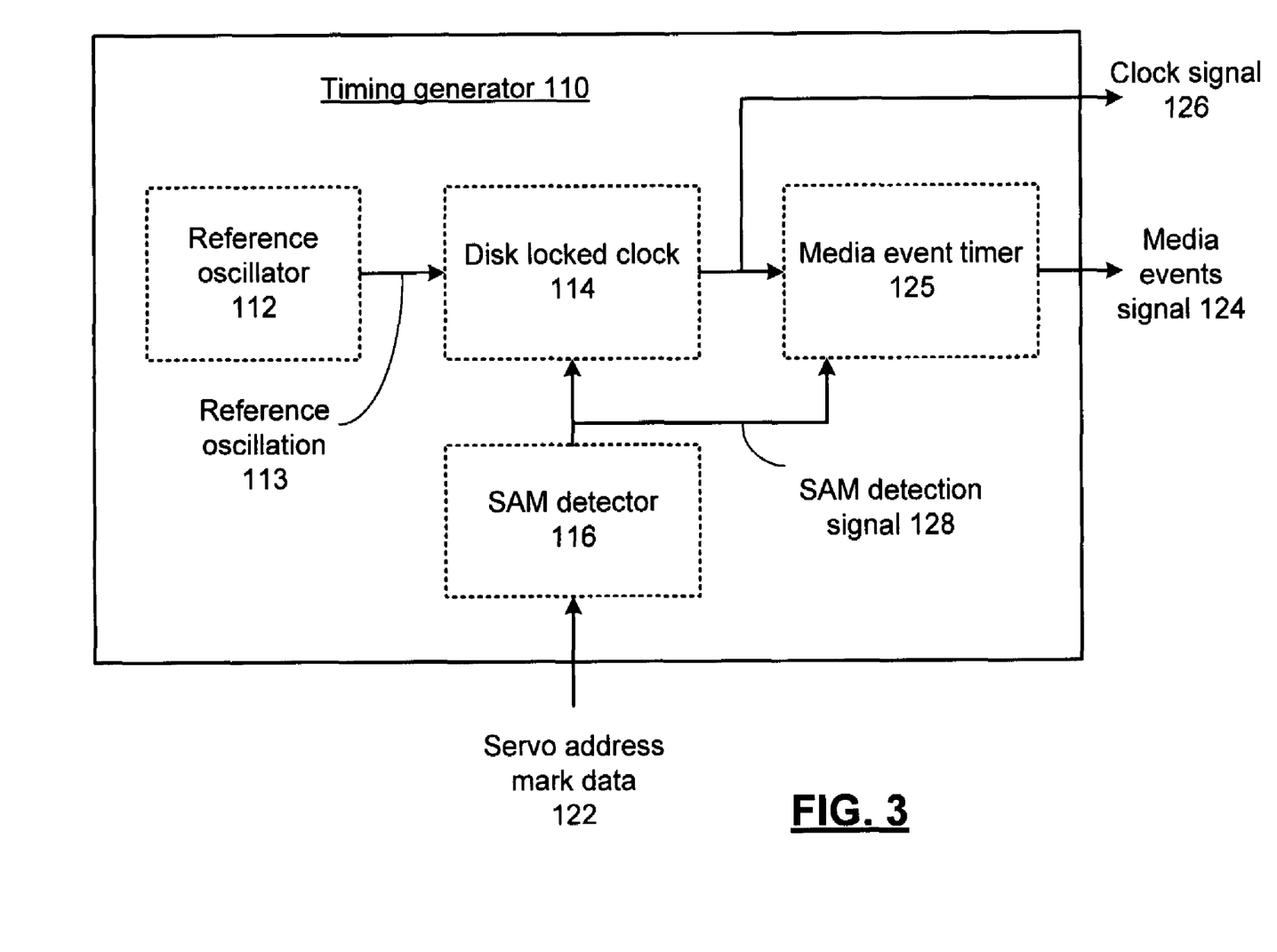
FIG. 3 presents a block diagram representation of a timing generator 110 in accordance with an embodiment of the present invention.

FIG. 3 presents a block diagram representation of a timing generator 110 in accordance with an embodiment of the present invention. In particular a timing generator 110 is presented that can include components of the read/write channel 140, disk formatter 125 and/or servo formatter 120. Timing generator 110 includes a reference oscillator 112, such as a crystal oscillator circuit with an on-board crystal or a crystal that is external to timing generator 110, for generating a reference oscillation 113. Servo address mark data 122 is read from the disk 102 and used by servo address mark (SAM) detector 116 to generate SAM detection signal 128. In an embodiment of the present invention, SAM detector 116 includes a digital matched filter, correlator or other circuit to determine if a servo address mark data 122 is present.

Disk locked clock 114 provides at least one clock signal 126, such as a data frequency clock or a servo frequency clock. In particular, the clock signal 126 is locked in phase and/or frequency with the SAM detection signal 128 so as to provide a substantially constant number of clock cycles between successive servo address marks. In an embodiment of the present invention, disk locked clock 114 includes a phase-locked loop (PLL) circuit that uses the phase error between a divided reference signal and the SAM detection signal 128 (when a servo address mark is detected) to adjust the phase or frequency in a closed loop control configuration.

Clock signal 126 and SAM detection signal 128 are used by media event timer 125 to produce media events signal 124, to trigger one or more media events. In an embodiment of the present invention, media events signal 124 provides the start times of one or more events such as a write event, a read event, timing event, and a servo control event that can be part of a read operation, write operation, servo control signal and other signal such as control signal used for timing or triggering the operation of the disk controller 130. These events can be part of a formatting of disk drive unit 100 during initial formatting as part of the factory setup and initialization of the drive, during subsequent formatting operations of disk drive unit 100 and during other use of disk drive 100 in normal operation. The start times of these events, since they are correlated to specific locations on the disk 102, are more precise than if generated by a constant frequency clock and automatically provide compensation for possible servo spin-speed variations.

Figure 4:
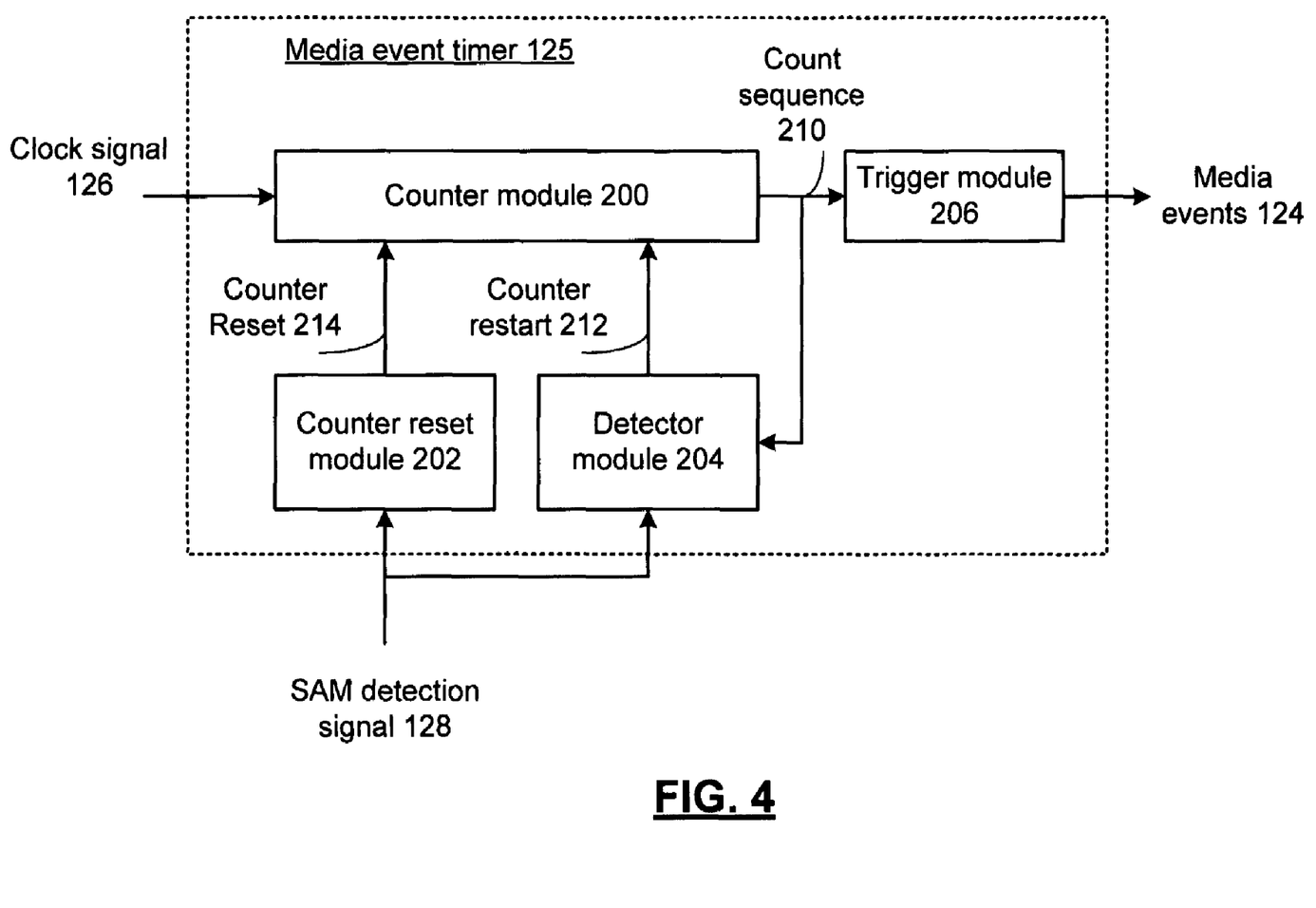
FIG. 4 presents a block diagram representation of a media event timer in accordance with an embodiment of the present invention.
Figure 5:
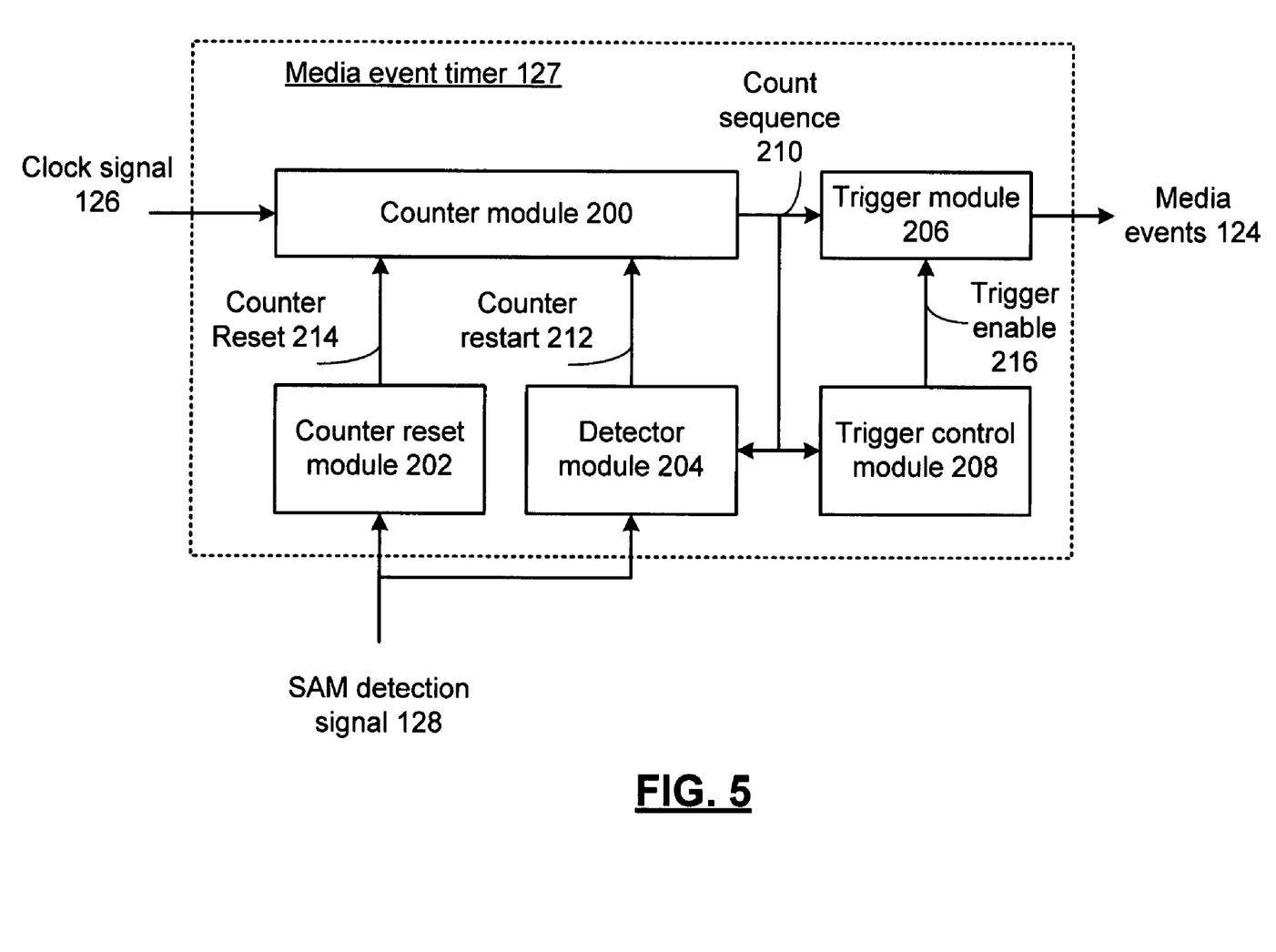
FIG. 5 presents a block diagram representation of a media event timer in accordance with an embodiment of the present invention.
Figure 6:
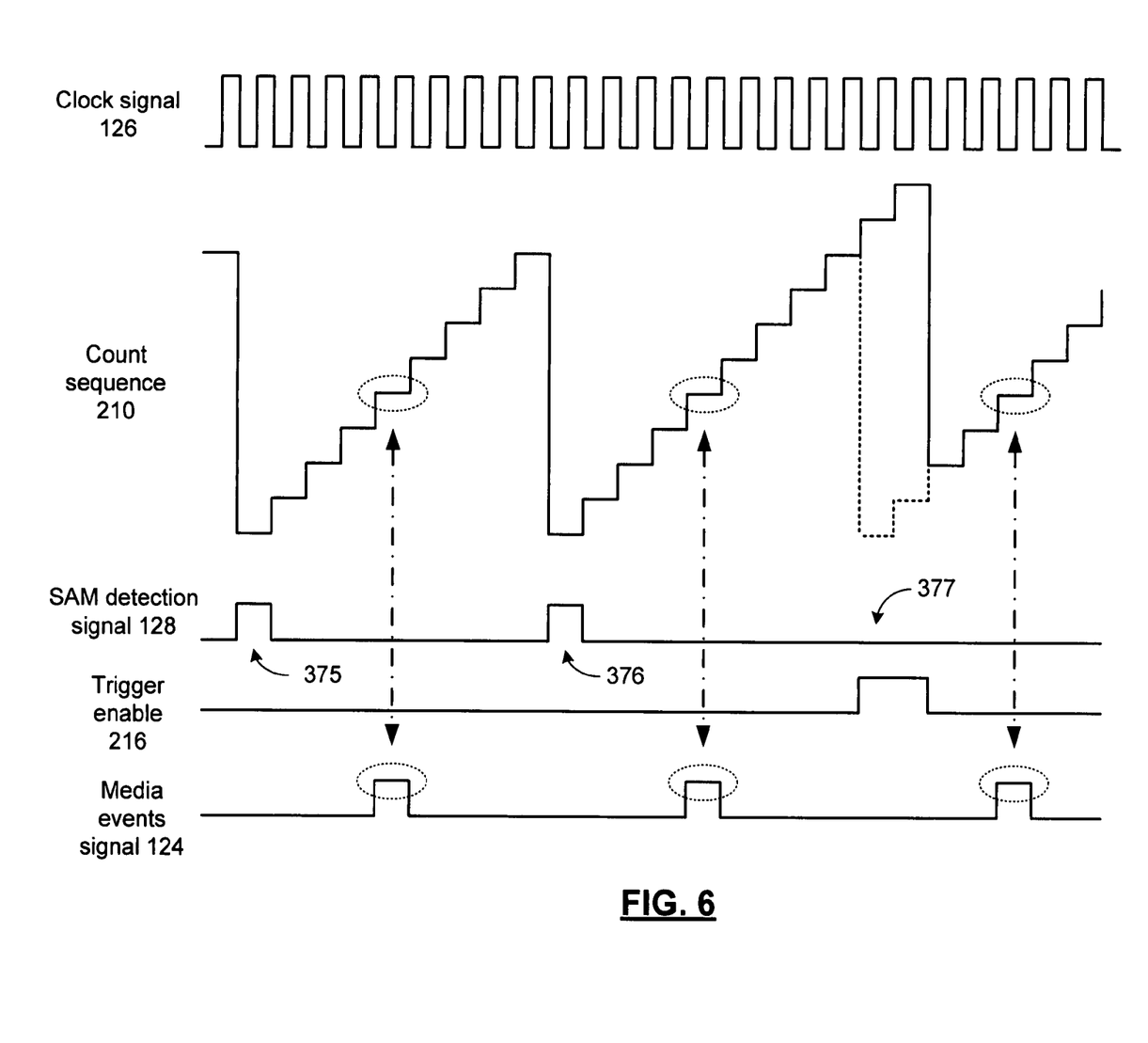
FIG. 6 presents a timing diagram in accordance with an embodiment of the present invention.

Further details regarding an implementation of media event timer 125 is presented in conjunction with FIGS. 4-6.

FIG. 4 presents a block diagram representation of a media event timer 125 in accordance with an embodiment of the present invention. In particular, one possible implementation for media event timer 125 is presented. In this embodiment, a counter module 200 generates a count sequence 210, based on a clock signal 126. A counter reset module 202, operably coupled to the counter module 200, sets the counter module 200 to a reset count via counter reset 214 in response to a servo address mark detection signal 128. A detector module 204, operably coupled to the counter module 200 and the servo mark detection signal 128, detects that a servo address mark has been missed and sets the counter module 200 to a restart count via counter restart 212 when the servo address mark has been missed. A trigger module 206, operably coupled to the counter module 200, triggers a first media event via media events signal 124 when a first media event count compares favorably to a count of the count sequence 210.

In operation, counter module 200 is set to a reset count, such as zero, by counter reset module 202 when a servo address mark is detected. Counter module 200 is incremented by each cycle of clock signal 126 as disk 102 spins until it is reset by counter reset module 202 in response to the detection of the next servo address mark. Trigger module 206 stores one or more media event counts corresponding to the start time of one or more media events. When a media event count compares favorably to a count of the count sequence 210, such as when the count equals a media event count, the media event is triggered.

Because clock signal 126 has a substantially constant number of clock cycles between successive servo address marks, counter module 200 counts up to a substantially constant count before being reset. In particular, absent variations in servo spin-speed and assuming that each servo address mark is detected, counter module 200 would reset at the same count, an expected servo address mark count, each time. This fact is used by media event timer to detect and compensate for a missed servo address mark. In an embodiment of the present invention, detector module 204 detects that a servo address mark has been missed when the count exceeds the expected servo address mark count by a detection threshold.

By means of illustration, the clock signal 126 can include a number, such as 4000 clock cycles, between successive servo marks. Therefore the expected servo address mark count is 4000 if the reset count is zero. Variations in servo spin-speed and PLL lock in disk locked clock 114 can cause this to vary by a number of clock cycles, such as +/− one clock cycle for each period. If the count reaches a greater value, such as 4004, corresponding to a detection threshold of four counts (in general, a number greater than or equal to the expected clock cycle variation), the detector module 204 detects that the servo address mark has been missed. In response, the detector module 200 restarts counter module 200 at a restart count that, in an embodiment of the present invention includes a count offset from the reset count. In particular, the restart count is set to be the difference between the current count and the expected servo address mark count—in this case a restart count of four. If a servo address mark is missed, the timing provided by count sequence 210 is based on clock signal 126 and timed from the timing of the last available servo address mark.

In an embodiment of the present invention, the counter reset module 202 can be selectively disabled or otherwise not used to reset the counter module 200 (and optionally not included in the design). In either of these cases, the counter module 200 will rollover to the reset count when the expected servo address mark count is reached or exceeded. In these cases, the detection threshold and restart count can be programmable and set to a small value or zero. While the counter module 200 has been described being incremented by each clock cycle of clock signal 126 so as to count up, it could likewise be decremented so as to count down. The reset count has been described as zero but can be any constant value, and particularly can be a high value if counter module 200 counts down rather than counting up. Many possible variations including offset counts or comparisons, different comparison operations using: less than, not less than, greater than or not greater than operations, may likewise be implemented in trigger module 206 within the broad scope of the present invention.

FIG. 5 presents a block diagram representation of a media event timer 127 in accordance with an embodiment of the present invention. In particular, this embodiment includes many common elements of media event timer 125, but further includes a trigger control module 208, operably coupled to the counter module 200 and the trigger module 216, for disabling the trigger module 206 when the count compares unfavorably to an expected servo address mark count, and for enabling the trigger module 206 when the count of the sequence of counts compares favorably to the expected servo address mark count. In an embodiment of the present invention, the trigger module 206 is disabled and no media events are triggered if the expected servo address mark count is exceeded. The trigger module 206 is enabled again when detector module 204 restarts counter module 200, or optionally when counter reset module 202 resets counter module 200.

FIG. 6 presents a timing diagram in accordance with an embodiment of the present invention. In particular, a timing diagram is represented that illustrates the operation of media event timers 125 and 127 in accordance with embodiments of the present invention. In this case, the following parameter values are used:

Reset count=0
Restart count=2
Count offset=2
Detection threshold=2
Expected servo address mark count=8
First media event count=4

A small value of expected servo address mark count is chosen to more easily illustrate the possible operation of media event timers 125 and 127. As discussed above, a greater value of expected servo address mark count, such as a value on par with, or greater than the number of data symbols, bytes or bits that are stored between successive servo address marks can be used in accordance with the present invention.

In response to the detection of a servo address mark at 375, shown by the pulse in the SAM detection signal 128, counter reset module 202 resets the count sequence 210 to zero. Count sequence 210 is incremented in response to cycles of clock signal 126 until the count reaches the first media event count. Trigger module 206, generates media events signal 124 to trigger the first media event in response. Sequence count continues to increase until a second servo address mark is detected at 376. The count sequence is reset as before and the media events signal 124 is also triggered as before. However, the next servo address mark (that should have occurred at 377) is missed. Count sequence continues to increment until the count reaches 10, the expected servo address mark count plus the detection threshold. Detector module 204 restarts the counter module 200 at a restart count of two (where the count would have been if the servo address mark had been received as expected at 377) and the first media event is again triggered when the count reaches 4. In this circumstance however, the trigger control module generates trigger enable 216 to disable trigger module 206 for counts 9 and 10 because the servo address mark had not been received. When the counter module 200 is restarted, the trigger module 206 is again enabled.

Figure 7:
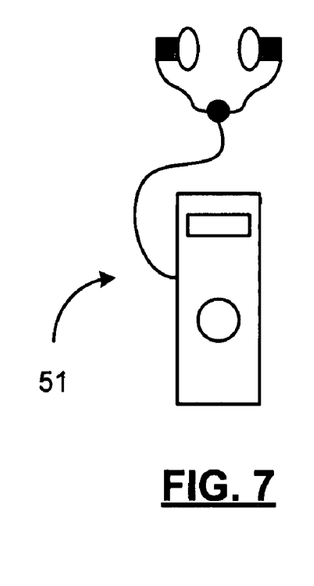
FIG. 7 presents a pictorial representation of a handheld audio unit 51 in accordance with an embodiment of the present invention.

FIG. 7 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 8:
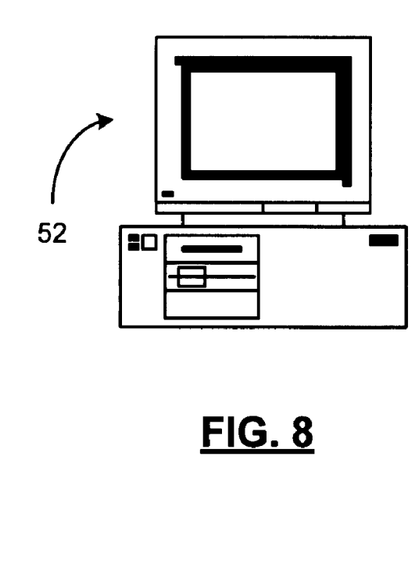
FIG. 8 presents a pictorial representation of a computer 52 in accordance with an embodiment of the present invention.

FIG. 8 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 9:
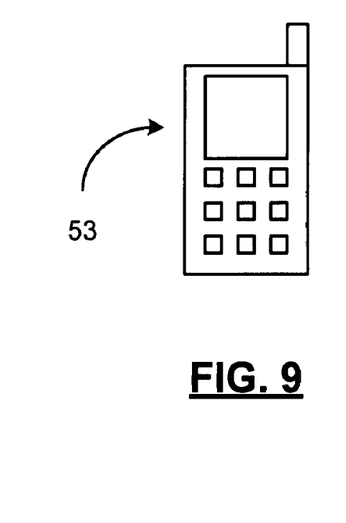
FIG. 9 presents a pictorial representation of a wireless communication device 53 in accordance with an embodiment of the present invention.

FIG. 9 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 10:
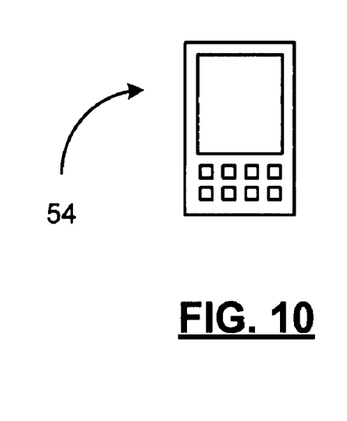
FIG. 10 presents a pictorial representation of a personal digital assistant 54 in accordance with an embodiment of the present invention.

FIG. 10 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG joint photographic expert group) files, bitmap files and files stored in other graphics formats, emails, webpage information and other information downloaded from the Internet, address book information, and/or any other type of information that may be stored in a digital format.

Figure 11:
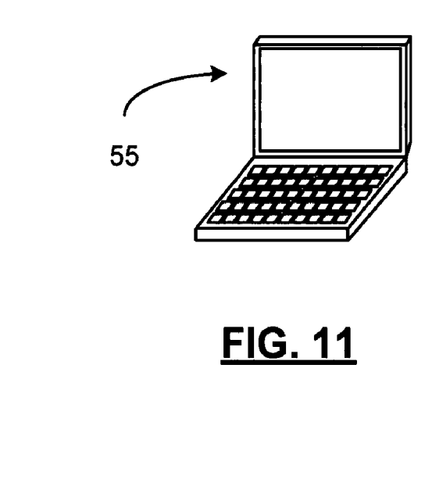
FIG. 11 presents a pictorial representation of a laptop computer 55 in accordance with an embodiment of the present invention.

FIG. 11 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 12:
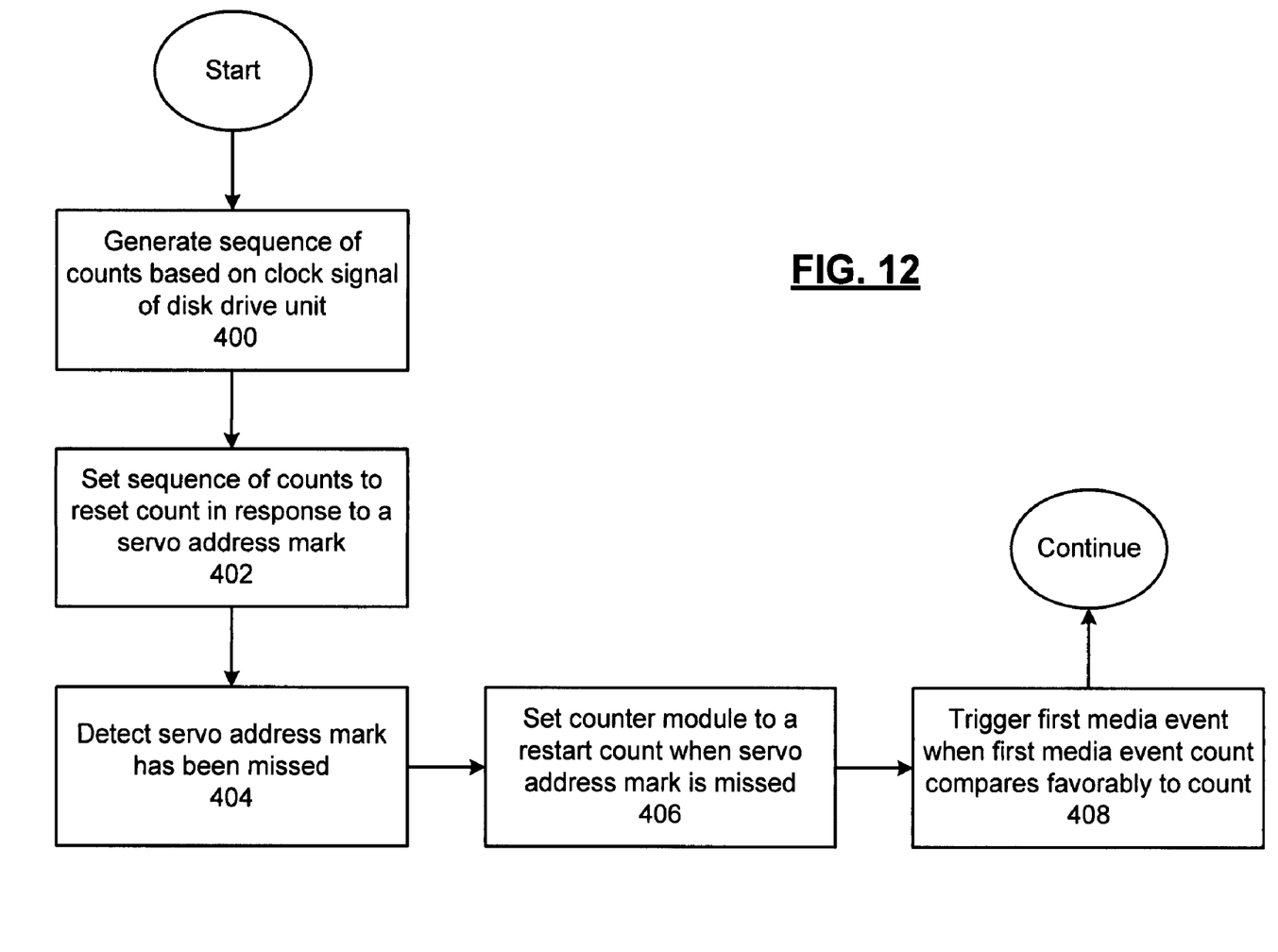
FIG. 12 presents a flowchart representation of a method in accordance with an embodiment of the present invention.

FIG. 12 presents a flowchart representation of a method in accordance with an embodiment of the present invention. In particular, a method is presented that can be used in conjunction with one or more of the features or functions described in association with FIGS. 1-11. In step 400 a sequence of counts is generated based on a clock signal of a disk drive unit. In step 402, the sequence of counts is set to a reset count in response to a servo address mark detection signal. In step 404, the method detects that a servo address mark has been missed. In step 406, the counter module is set to a restart count when the servo address mark has been missed. In step 408, a first media event is triggered when a first media event count compares favorably to a count of the sequence of counts.

In an embodiment of the present invention, as previously discussed, the restart count can include a count offset from the reset count and the clock signal can be a disk locked clock signal. Further, step 408 can be disabled when the count of the sequence of counts compares unfavorably to an expected servo address mark count and can be enabled when the count of the sequence of counts compares favorably to the expected servo address mark count.

Figure 13:
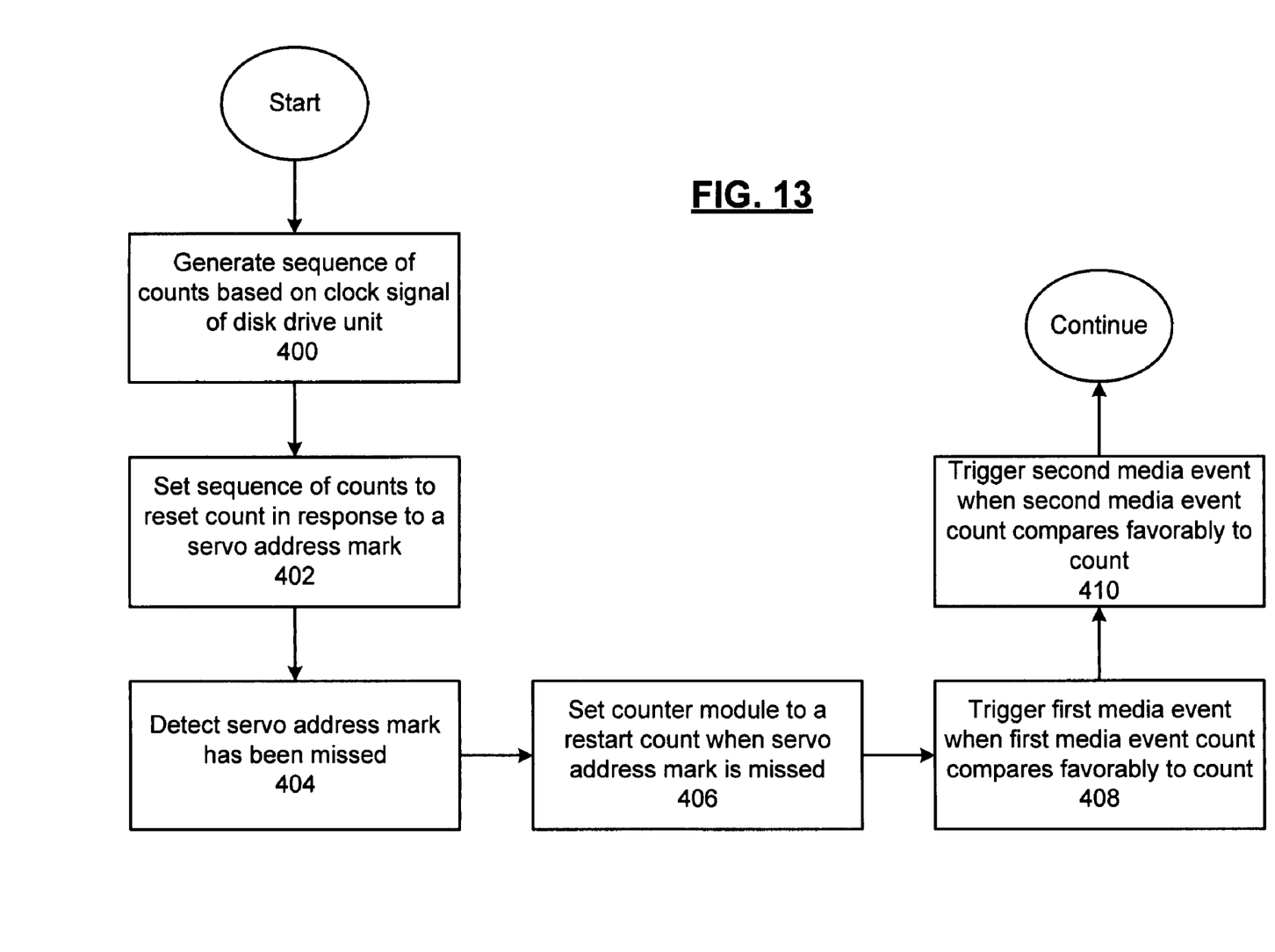
FIG. 13 presents a flowchart representation of a method in accordance with an embodiment of the present invention.

FIG. 13 presents a flowchart representation of a method in accordance with an embodiment of the present invention. A method is presented that can be used in conjunction with one or more of the features or functions described in association with FIGS. 1-12, an in particular includes steps 400, 402, 404 406 and 408 of FIG. 12. In step 410 a second media event is triggered when a second media event count compares favorably to the count of the sequence of counts. As previously discussed, the first and second media events can be part of a plurality of media invents that each may include a write event, read event, timing event, and/or servo control event.

Figure 14:
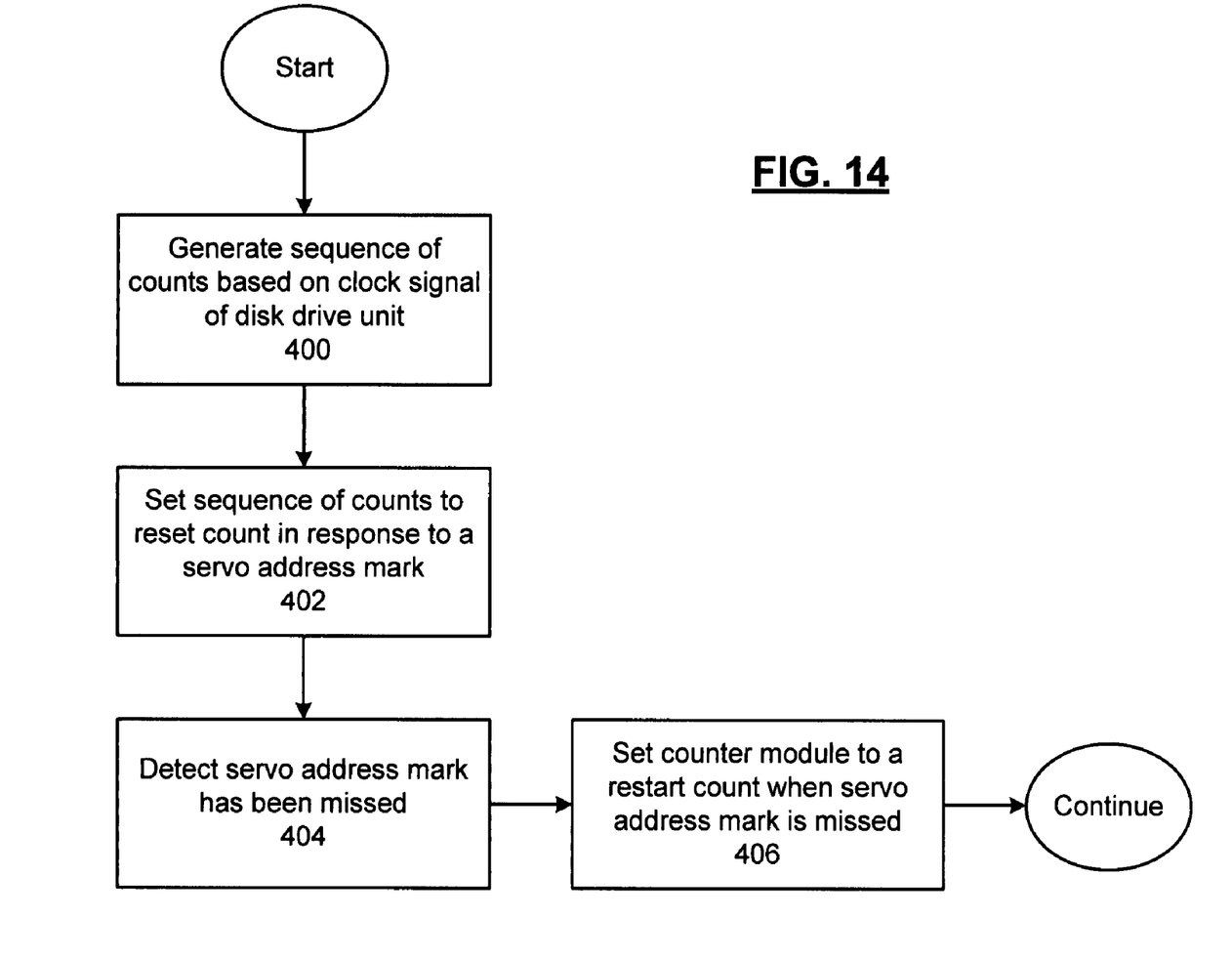
FIG. 14 presents a flowchart representation of a method in accordance with an embodiment of the present invention.

FIG. 14 presents a flowchart representation of a method in accordance with an embodiment of the present invention. A method is presented that can be used in conjunction with one or more of the features or functions described in association with FIGS. 1-13, and In particular, the method includes steps 400, 402, 404 and 406 of FIG. 12 as previously discussed. In accordance with this embodiment of the present invention, the method detects that a servo address mark has been missed for any purpose that it may be useful to the operation of dick controller 130.

Figure 15:
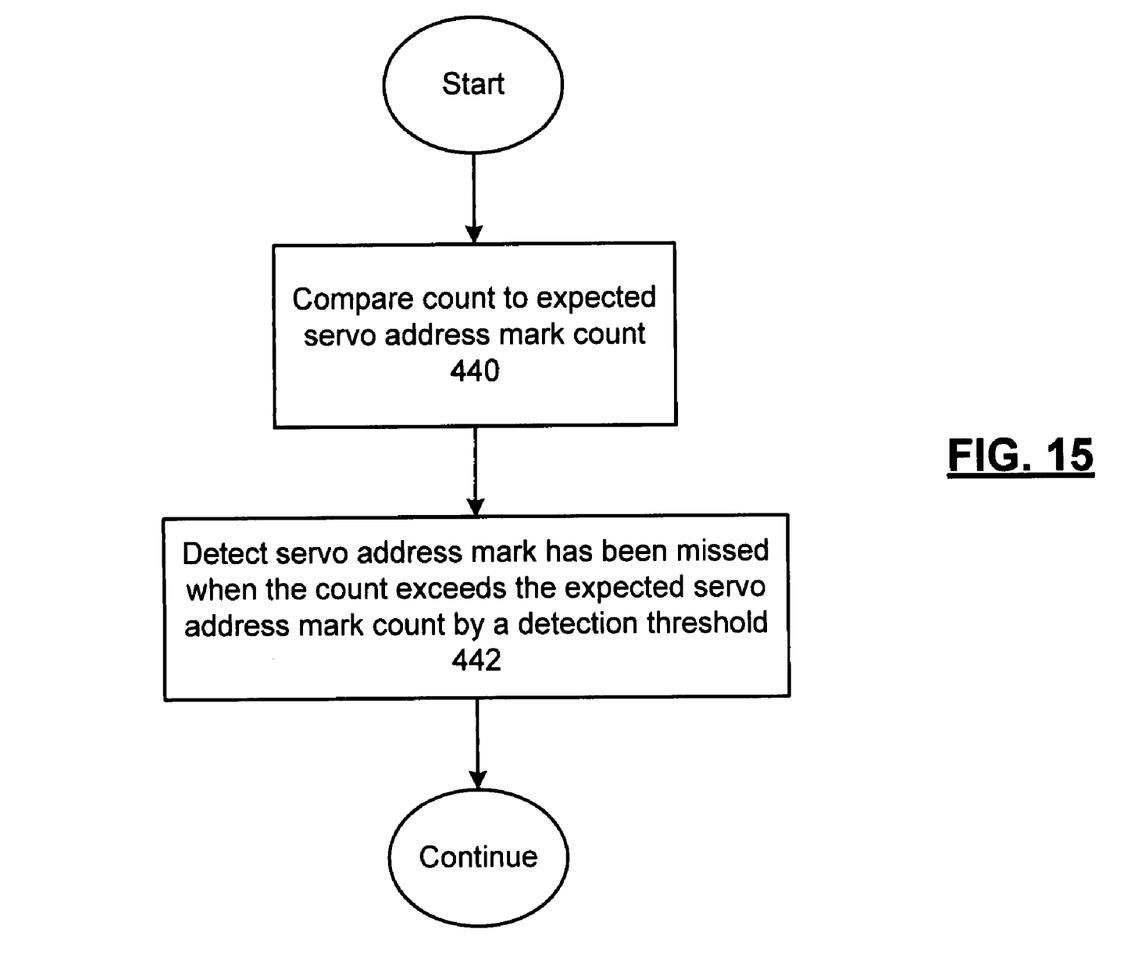
FIG. 15 presents a flowchart representation of a method in accordance with an embodiment of the present invention.

FIG. 15 presents a flowchart representation of a method in accordance with an embodiment of the present invention. A method is presented that can be used in conjunction with one or more of the features or functions described in association with FIGS. 1-14, and in particular, for implementing step 404 of FIGS. 12-14. A missed servo mark is detected by comparing the count of the sequence of counts to an expected servo address mark count in step 440 and detecting that a servo address mark has been missed when the count of the sequence of counts exceeds the expected servo address mark count by a detection threshold in step 442.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a memory and a processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A media event timer comprising:
   a counter module for generating a sequence of counts, based on a clock signal of a disk drive unit;
   a counter reset module, operably coupled to the counter module, for setting the counter module to a reset count in response to a servo address mark detection signal;
   a detector module, operably coupled to the counter module and the servo mark detection signal, for detecting that a servo address mark has been missed and for setting the counter module to a restart count when the servo address mark has been missed;
   a trigger module, operably coupled to the counter module, for triggering a first media event when a first media event count compares favorably to a count of the sequence of counts; and
   a trigger control module, operably coupled to the counter module and the trigger module, for disabling the trigger module when the servo address mark is missed and for enabling the trigger module when the counter module is set to the restart count.

2. The media event timer of claim 1 wherein the restart count includes a count offset from the reset count.

3. The media event timer of claim 1 wherein the detector module detects that a servo address mark has been missed when the count of the sequence of counts exceeds an expected servo address mark count by a detection threshold.

4. The media event timer of claim 1 wherein the trigger module triggers a second media event when a second media event count compares favorably to the count of the sequence of counts.

5. The media event timer of claim 1 wherein the first media event includes one of: a write event, a read event, a timing event, and a servo control event.

6. The media event timer of claim 1 wherein the clock signal is a disk locked clock signal.

7. The media event timer of claim 1 wherein at least one of: the counter module, the counter reset module, the detector module, and the trigger module, are implemented as part of a system on a chip integrated circuit.

8. A method comprising:
   generating a sequence of counts, based on a clock signal of a disk drive unit;
   setting the sequence of counts to a reset count in response to a servo address mark detection signal;
   detecting that a servo address mark has been missed;
   setting the sequence of counts to a restart count when the servo address mark has been missed; and
   triggering a first media event when a first media event count compares favorably to a count of the sequence of counts;
   wherein the step of triggering a first media event is disabled when the servo address mark is missed and is enabled when the count is set to the restart count.

9. The method of claim 8 wherein the restart count includes a count offset from the reset count.

10. The method of claim 8 wherein the step of detecting that a servo address mark has been missed includes:
    comparing the count of the sequence of counts to an expected servo address mark count; and detecting that a servo address mark has been missed when the count of the sequence of counts exceeds the expected servo address mark count by a detection threshold.

11. The method of claim 8 further comprising:
triggering a second media event when a second media event count compares favorably to the count of the sequence of counts.

12. The method of claim 8 wherein the first media event includes one of: a write event, a read event, a timing event, and a servo control event.

13. The method of claim 8 wherein the clock signal is a disk locked clock signal.

* * * * *